Aug. 23, 1966     H. E. SAYLOR     3,267,900
BRAKE SHOE-WORN LINING INDICATING DEVICE
Filed Nov. 30, 1964
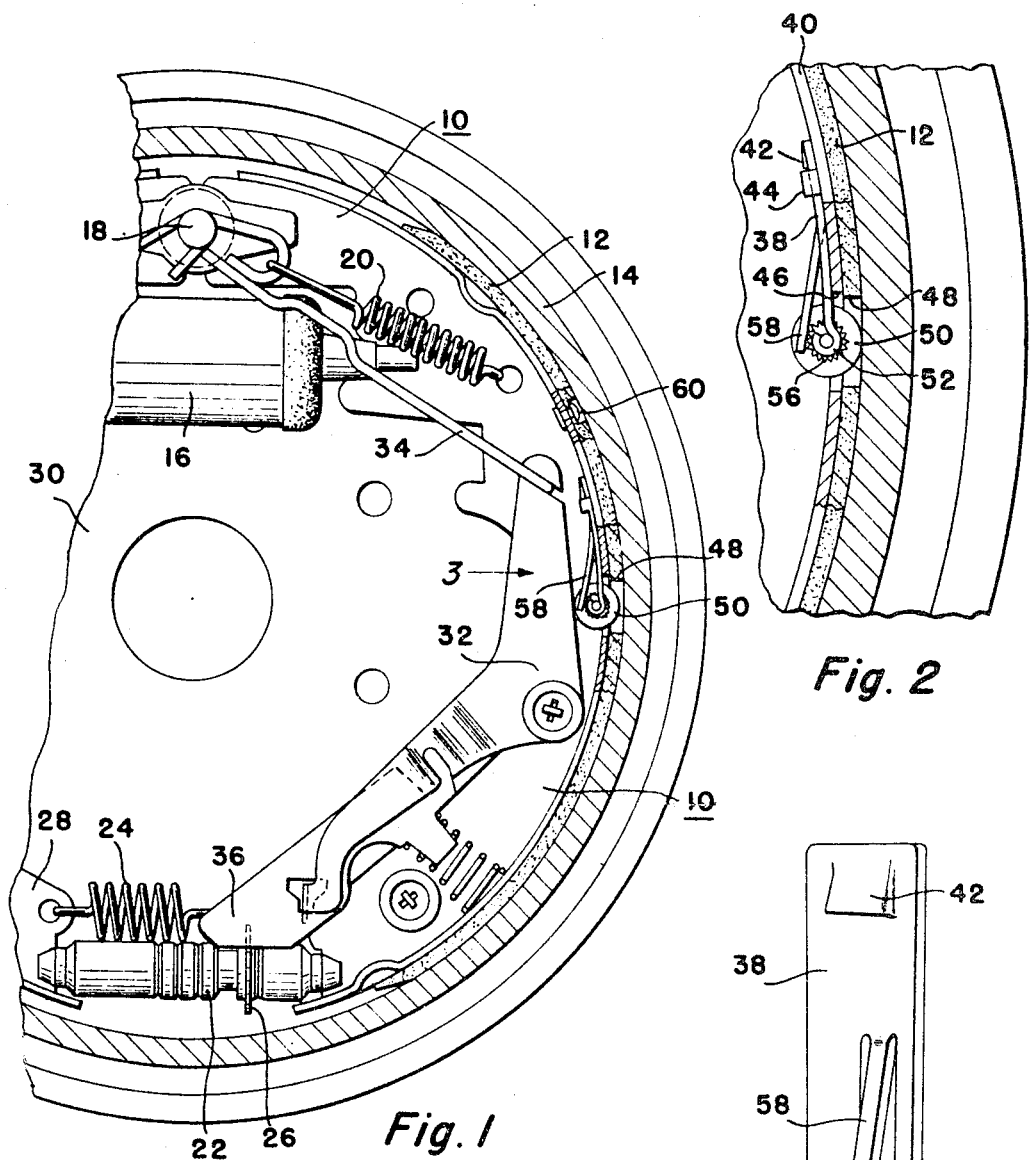
Fig. 1
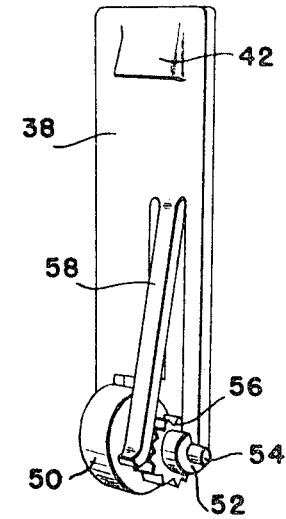
Fig. 2
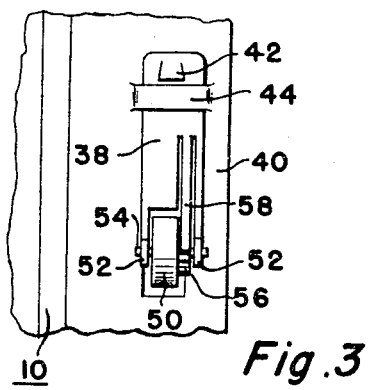
Fig. 3
Fig. 4
INVENTOR.
Herman E. Saylor
BY
Donald P. Selvecki
His Attorney 3,267,900
BRAKE SHOE—WORN LINING INDICATING DEVICE
Herman E. Saylor, Waynesville, Ohio, assignor to General Motors Corporation, Detroit, Mich., a corporation of Delaware
Filed Nov. 30, 1964, Ser. No. 414,779
1 Claim. (Cl. 116—67)

This invention relates to vehicle braking systems and more particularly to a device designed to apprise a vehicle operator of excessive brake lining wear.

It is an object of the present invention to provide an improved warning device providing an audible sound to a vehicle operator when brake lining wear has progressed past a predetermined minimum point.

It is another object of the present invention to provide an improved brake lining wear sensing device which has a minimum number of moving parts and is therefore simple and economical to manufacture.

It is still another object of the present invention to provide an improved brake lining wear sensing device which is adaptable for use on many different types of standard production braking systems.

Further objects and advantages of the present invention will be apparent from the following description, reference being had to the accompanying drawings wherein a preferred embodiment of the present invention is clearly shown.

In the drawings:

FIGURE 1 is an elevational view, partly in section, of a typical vehicle braking system having a self-adjusting mechanism;

FIGURE 2 is an enlarged view of the subject invention showing the device positioned in its operative environment;

FIGURE 3 is a view in the direction of arrow 3 in FIGURE 1;

FIGURE 4 is a perspective view of the subject invention.

Referring now to FIGURE 1, a typical vehicle wheel brake is shown wherein a brake shoe 10 carrying a lining 12 is drivable into frictional engagement with a rotatable drum 14 by fluid pressure developed in a cylinder 16. The brake shoe 10 is held against an anchor pin 18 by return spring 20. An opposite end of the brake shoe 10 is kept in engagement with an expandable device 22 by the force of a spring 24 engaging opposed ends of oppositely positioned brake shoes similar to the shoe 10. A star wheel 26 of the expandable device 22 is an actuating member therefor and, upon being rotated, drives the brake shoe 10 and a brake shoe 28 in opposite directions against the force of spring 24. It should be noted that the braking mechanism described herein is fixed to a backing plate 30 carried by a relatively fixed portion of the vehicle wheel while the brake drum 14 is carried by a rotatable portion of the vehicle wheel. Therefore, a braking action is generated by driving the lining 12 into frictional engagement with the drum 14.

As the lining 12 is repeatedly driven into engagement with the rotatable drum 14 in successive brake applications, wear occurs on the lining 12. But for an adjusting mechanism, the poised position of the brake lining 12 relative to the drum 14 would cause an increased spacing therebetween. More displacement of fluid in the cylinder 16 would therefore become necessary in order to provide a braking action and, consequently, the brake pedal actuator would require more travel to perform the braking. An automatic adjusting mechanism is provided in order to maintain a predetermined clearance between the lining 12 and the drum 14 as wear occurs on the lining 12. This adjusting mechanism typically involves a lever 32 pivoted on the secondary shoe 10, said lever being held on one end by link rod 34 engaging the anchor pin 18 and having an opposite end 36 engaging the star wheel 26. Therefore, if excessive movement of the shoe 10 is required in order to bring about a braking action, the lever 32 will pivot about the link rod 34 so that the opposite end 36 moves relative to the star wheel 26. A tooth of the star wheel 26 is engaged if the movement is beyond predetermined limits, thereby causing an expanding movement of the expandable means 22. In this manner, the lining 12 is positioned nearer the drum 14 bringing about a brake adjustment.

The subject invention is clearly illustrated in FIGURE 2 wherein a support member 38 is carried along a flange 40 of the brake shoe 10 and includes a struck-out tab 42 slidable through a retaining strip 44 formed in the flange 40 and engageable therewith. The strip 44 is also shown in FIGURE 3 and the tab 42 is shown operatively disposed relative to the strip 44. Referring to FIGURE 2, the main body of the support element 38 is seen to parallel the flange 40 in contiguous relationship thereto. An aperture 46 in the flange 40 and aperture 48 in the lining 12 combine to receive a rotatable wheel 50 carried by a turned-over portion 52 of the element 38.

A shaft 54, received in complementary portions 52 integrally formed with the element 38, carries the rotatable wheel 50 and a ratchet wheel 56, preferably integrally formed therewith. It is understood that the ratchet wheel 56 could be integrally formed with the wheel 50 or carried by the shaft 54 in a non-rotatable manner with respect to the wheel 50. A resilient strip 58 is struck from the element 38 and resiliently engages the ratchet wheel 56.

In operation, the subject device gives an audible warning to a vehicle operator of brake lining wear below a predetermined minimum level. Referring to FIGURE 1, a rivet 60 is illustrated as retaining the lining 12 to the flange 40, and the wheel 50 is illustrated as protruding into the aperture 48 at approximately the level of the rivet 60. In a rigid lining, such as illustrated in FIGURE 1, the head of the rivet 60 would be the minimum acceptable depth to which the lining 12 should be worn. It is understood that, in a bonded type lining, this minimum acceptable limit for lining wear would be established in a different manner. When lining wear progresses during repeated brake applications to the level illustrated by the head of the rivet 60, the wheel 50 will engage the drum 14. When this occurs and the lining 12 is moved into engagement with the drum 14 during a braking action, the wheel 50 will be caused to rotate against the drum 14 then moving relative to the lining 12 and the shoe 10. When the wheel 50 rotates, the ratchet wheel 56 rotates therewith against the biasing force of the resilient strip 58. The strip 58 is formed of any well-known resilient metal and will follow an erratic path along the teeth of the ratchet wheel 56. The resilient strip 58 will therefore intermittently contact the sides of the teeth on the ratchet wheel 56 creating a noise. Due to the metallic construction of the element 38, the wheel 50 and the flange 40, a noise, audible to the operator of the vehicle, will result, thereby apprising him of brake lining wear below a predetermined minimum level.

It is clear that the rotating wheel 50 will not damage the surface of the drum 14 and the interference between the ratchet wheel 56 and the resilient strip 58 does not bring about a deleterious effect on the brakes or the braking mechanism. The noise, generated by the strip 58 being vibrated by the wheel 56, will be continuous once this level of minimum wear is reached but will not affect further braking actions. Therefore, the vehicle operator is warned as soon as brake wear is excessive and replacement of the lining can be effected at his convenience. However, while driving the vehicle with the worn linings, he is constantly reminded during each brake application that servicing of the vehicle brakes is necessary.

While the embodiment of the present invention, as herein disclosed, constitutes a preferred form, it is to be understood that other forms might be adopted.

What is claimed is as follows:

A brake lining wear sensing device comprising: a brake shoe carrying friction material and having a struck-out portion forming a retaining strip on a side opposite from the friction material, said brake shoe and friction material having aligned openings spaced from said retaining strip therethrough, a support member including a tang engageable by said retaining strip to resiliently and releasably hold said support member on said brake shoe; bearing means integral with said support member and spaced from said tang; a wheel element rotatably supported by said bearing means and disposed in said aligned openings to a depth determined to be the minimum acceptable wear level of said lining; a ratchet wheel carried by said wheel element non-rotatably with respect thereto; and a resilient strip struck out from said support member and engaging the ratchet wheel, said wheel element being rotated by contacting a brake drum as said friction material wear progresses to a predetermined point whereby the ratchet wheel is rotated against the resilient strip thereby generating an audible sound.

References Cited by the Examiner

UNITED STATES PATENTS 3,139,063  6/1964  Rinkerman _____ 116—67

LOUIS J. CAPOZI, *Primary Examiner.*